Patented Dec. 27, 1932

1,892,655

UNITED STATES PATENT OFFICE

REGINALD K. STRATFORD, OF SARNIA, ONTARIO, CANADA, ASSIGNOR TO STANDARD OIL DEVELOPMENT COMPANY, A CORPORATION OF DELAWARE

PROCESS FOR TREATING MINERAL OILS

No Drawing. Application filed March 26, 1929. Serial No. 350,130.

The present invention relates to an improved process for the purification of hydrocarbon oils and more specifically comprises a method for treating oils with selective solvents which dissolve undesirable constituents from the oil. The invention will be fully understood from the following description:

The present process is applicable to treatment of mineral oils such as kerosene, light and heavy lubricating oils, and the like. I have found that such oils are much improved by treatment with a selective solvent comprising phenol admixed with a suitable organic vehicle, which is immiscible or only slightly miscible with hydrocarbon oil, and for this purpose I prefer polyhydric alcohols such as glycol and glycerol, with or without small quantities of other materials, such as water. The proportion of phenol to the vehicle may be varied somewhat and the preferable composition depends on the nature of the particular vehicle, but in general the proportion of phenol should vary between about 65 and 95% of the mixture by weight.

The treatment of the oil comprises washing either continuously or in batch with the solvent mixture. A systematic countercurrent method is to be preferred and the quantity of the treating mixture will be reduced by such a method. The quantity of phenol mixture required depends on the degree of improvement required and usually from 100 to 300% by volume of the raw oil to be treated, will be used. After the treatment, the mass is allowed to settle and layers form which are then separately withdrawn. The upper layer of purified oil contains a minor portion of phenol which may be removed by washing with aqueous soda or with alkaline phenolate, either in aqueous solution or in solution in an organic material relatively immiscible with the oil, such as glycol or glycerol.

The solvent withdrawn may be separated from the extracted oil in any suitable manner so that both phenol and the solvent therefor may be recovered for reuse. If the oil treated is in a heavy high boiling oil, it is generally preferable to distill the solvent mixture therefrom, and vacuum distillation may be used. With light oil, such as kerosene, it is generally preferable to wash with low boiling naphtha so as to remove the kerosene from the solvent mixture and subsequently separate the naphtha from both the kerosene and the solvent mixture by distillation or rectification. It will be unnecessary to describe the recovery method more fully since it is completely described in my copending application Serial No. 279,602, filed on May 21st, 1928.

As an example of the use of my process, a kerosene of the following character is treated with an equal volume of a solvent comprising 90% phenol and 10% glycol at 100° F.

Gravity _____ 41.9° A. P. I.
Viscosity— 300° seconds Saybolt Thermo at 60° F.

The treat is in a single batch and after settling and withdrawal of the solvent mixture, the purified oil is washed with caustic soda solution and with water. The purified oil has the following characteristics:

Gravity _____ 44.1° A. P. I.
Viscosity— 300° seconds Saybolt Thermo at 60° F.

The treating loss is 34.5% and the purified oil is found to be improved as to color, sulphur content, and burning quality.

As a second example of the use of my process, a lubricating cut from Colombian crude of the following characteristics is treated successively with three volumes of phenol-glycerol mixture containing 90% phenol. Each is equal to 100% of the oil treated.

Gravity _____ 20.3° A. P. I.
Cold test _____ 15–10° F.
Saybolt viscosity at 210° F _____ 98 sec.
Saybolt viscosity at 100° F _____ 2000 sec.

The treatment is carried out at 100° F. and there is a treating loss of 25% of the feed. The purified oil is then washed with soda and water as above and shows the following tests:

```
Gravity_____23.9° A. P. I.
Cold test_____ 0/−5° F.
Saybolt viscosity at 210° F_____ 85. sec.
Saybolt viscosity at 100° F_____ 1300 sec.
```

The oil is likewise improved as to its color and general lubricating qualities.

The temperature of treating may be varied considerably with the solvents proposed. The solvent activity is changed very little with rise of temperature so that it is often advantageous to treat at temperatures of 200° F. or higher, particularly in the case of heavy viscous oils.

My method is not to be limited by any theory of the chemical or physical action of the solvents nor by any example given merely for purposes of illustration but only by the following claims in which I wish to claim all novelty inherent in the process.

I claim:

1. The process for purifying liquid petroleum hydrocarbon oil which comprises agitating the oil with a selective solvent, comprising about 65 to 95% of phenol and 35 to 5% of a polyhydric alcohol to extract impurities, and removing the solvent and extracted impurities from the purified oil.

2. The process according to claim 1 in which the polyhydric alcohol consists of glycol.

3. The process according to claim 1 in which solvent is agitated with about 1 to 3 volumes of the selective solvent.

REGINALD K. STRATFORD.